(No Model.)
N. BOSMANN.
NUT LOCK.
No. 488,958.　　　　　　　　　Patented Dec. 27, 1892.
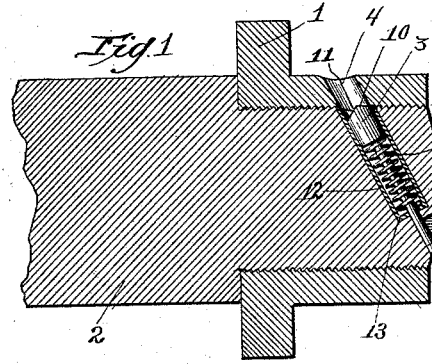
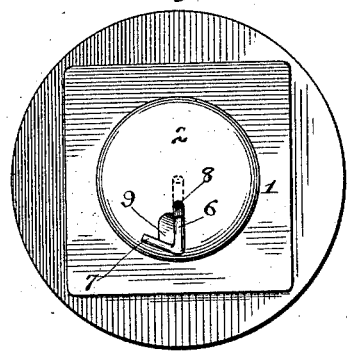
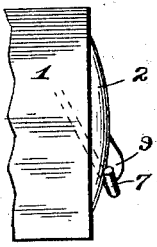
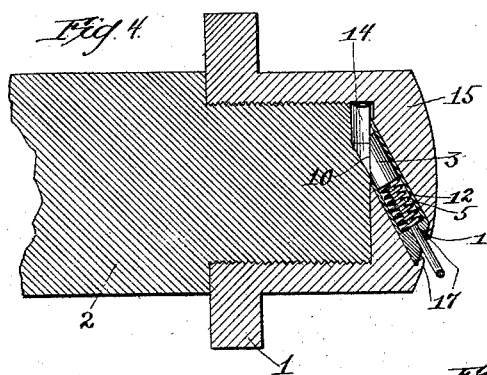
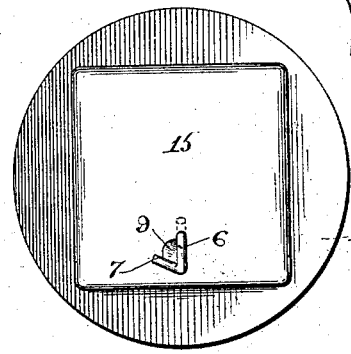
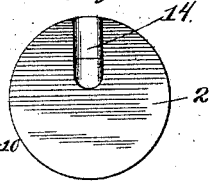
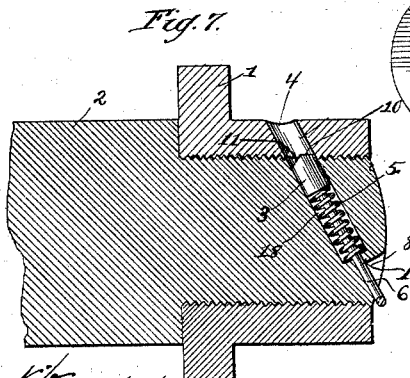
Witnesses:
Wm. F. Henning
Wm. M. Rheem
Inventor:
Nicolas Bosmann
By Elliott & [Attorney]

UNITED STATES PATENT OFFICE.

NICOLAS BOSMANN, OF CHICAGO, ILLINOIS, ASSIGNOR OF ONE-HALF TO GEORGE H. STERNE, OF SAME PLACE.

NUT-LOCK.

SPECIFICATION forming part of Letters Patent No. 488,958, dated December 27, 1892.

Application filed May 11, 1892. Serial No. 432,605. (No model.)

*To all whom it may concern:*

Be it known that I, NICOLAS BOSMANN, a citizen of the United States, residing at Chicago, in the county of Cook and State of Illinois, have invented certain new and useful Improvements in Nut-Locks, of which the following is a full, clear, and exact specification.

My invention relates to improvements in nut-locks, which may be used for general purposes, but more particularly it has reference to means for locking the nuts employed for holding vehicle wheels in place on the axles.

The primary object of my invention is to provide a simple and effective device for this purpose, which will be capable of automatically locking the nut when it is screwed into place on the axle.

With this end in view, my invention consists in certain features of novelty in the construction, combination and arrangement of parts, by which the said objects and certain other objects hereinafter described are attained, as fully explained with reference to the accompanying drawings and more particularly pointed out in the claims.

In the said drawings, Figure 1, is a longitudinal section of an axle and nut of the kind usually employed on wagons, showing my improvements applied thereto, the locking mechanism being in its released position; Fig. 2, is an end view or front elevation of the same; Fig. 3, is a side elevation of the same, portions being broken away; Fig. 4, is a view similar to Fig. 1, but showing the axle provided with a cap nut and the locking mechanism being arranged in such nut; Fig. 5, is an end view or front elevation of the same; Fig. 6, is an end elevation of the axle shown in Fig. 4, illustrating the groove or notch in the end thereof; and Fig. 7, is a view similar to Fig. 1, but of a modification hereinafter described.

Like signs of reference indicate like parts throughout the several views.

In carrying out my invention, I propose to lock the nut by means of a spring actuated lug or bolt, adapted to engage in a socket or notch in either the nut or the axle, and having a portion or stem extending to the exterior, whereby such lug or bolt may be held withdrawn or disengaged, while the nut is being unscrewed. On wagons and other heavy vehicles, it is customary to employ a nut which is open at both ends; that is to say, bored entirely through, as shown in Fig. 1; and in adapting my invention for use in connection with nuts of this form, I prefer to locate the spring actuated bolt or lug in the axle and have it project from the axle into a socket or cavity formed in the nut.

Referring more particularly to Figs. 1 to 3 of the drawings, 1 represents the nut of the form described screwed upon the end of the axle 2, and 3 is the spring actuated bolt or lug, located within a socket or bore in the end of the axle and adapted to be forced therefrom into a suitable socket or cavity 4, formed in or through the side of the nut 1. To render the bolt or lug 3 automatic in its operation, I locate a spring of any suitable construction, such as the coil spring 5, between the inner end of the bolt or lug 3 and the end of the bore or socket in the axle in which said lug 3 is located, thus giving such lug a normal tendency to project outward from its socket and thereby adapting it to automatically engage in the socket 4 in the nut, when the latter is screwed onto the axle sufficiently far to bring such socket 4 into co-incidence with the outer end of the bolt or lug. In order that the bolt or lug 3 may be withdrawn from engagement with the nut when desired, I provide such bolt or lug with any suitable stem 6, which passes through the end of the axle and is provided with a projection, arm or hook, 7, which serves as a thumb piece, by means of which the bolt or lug may be withdrawn against the pressure of the spring 5. The outer end of the axle adjacent to the stem 6, is provided with a cavity or depression 8, which is adapted to receive the hook 7 when the stem 6 is drawn inward by the spring 5, so as to partially embed the hook 7 in the end of the axle and prevent damage thereto, while the nut is in its locked position. The stem 6 is capable of rotation when in its withdrawn position and to the end that the hook 7 may be utilized for holding the bolt or lug 3 in its disengaged position, I provide the end of the axle, at a point to one side of the cavity 8, with a nose or projection 9, under which the hook 7 may be engaged when the stem 6 is withdrawn and rotated into the position shown in Figs. 2 and 3, in a manner which will be readily understood.

In order that the end of the lug or bolt 3 may not project beyond the periphery of the axle when it is in its withdrawn position, as shown in Fig. 1, I provide the outer end thereof with a bevel 10, which, as will be readily seen, permits the nut to be unscrewed without striking the bolt or lug; and in order that the outer end of the bolt may be flush with the side of the nut when the bolt is in its outer or engaged position, I provide such bolt with a bevel 11.

As a convenient and preferred manner of providing the axle with a spring actuated bolt or lug, as described, I form the bore or socket in which said bolt or lug is situated, at an oblique angle to the axle, as shown in Fig. 1, beginning at a point about mid-way of the threaded end of the axle and terminating at the opposite side in the front or end thereof, such bore, if desired, being formed entirely through the axle and a box or sleeve 12 being then driven into the bore, and the metal around the outer end of the bore being mashed down or up-set over the end of the box 12, in a well known manner, thus securing the box in place and forming a shoulder, upon which the inner end of the spring 5 abuts, but preferably, the end of the box is provided with a shoulder 13, which serves as an abutment for the spring and a guide for the stem 6. A further advantage gained by the employment of an obliquely arranged bolt is, that when the angular thumb piece or hook 7 is turned in the act of forcing it up the inclined nose or projection 9, its end will strike against the face of the axle or nut and such face being at an oblique angle to the line of the bolt, the movement will of course cause the bolt to be withdrawn.

When the improvements are applied to a cap nut, such as usually employed on buggies and light vehicles, I provide the end of the axle with a notch or cavity 14, and locate the spring actuated bolt or lug 3 in the head 15 of the nut, as more clearly shown in Fig. 4, instead of in the axle, as in the form described. The manner of arranging and holding the spring actuated bolt may be the same in this instance, as in the form already described, and it is preferable for the sake of greater length in the spring 5 and greater movement of the bolt or lug 3, to form the bore or socket in which such spring and bolt are located, on an incline, or obliquely to the face of the nut, it being, of course, understood, that the head 15 of the ordinary cap nut is not of sufficient thickness to accommodate the bolt or lug 3, and the spring, if arranged in axial alignment with the axle. In this instance, also, the end of the bolt 3 is beveled, as shown at 10, so as to be flush with the inner face of the head 15, when the bolt or lug is in its withdrawn position. The nose or projection, 9, in this instance is of course, formed on the head 15 of the nut, instead of up on the end of the axle. The box 12, if desired, may be provided with a beveled end 16, through which the stem 6 passes, so as to form a more even surface, upon which the metal of the head 15 may be upset, as shown at 17. In the operation of this form, the bolt or lug 3 may be held in its withdrawn or retracted position, by means of the hook 7 and nose 9, as described, until the nut is nearly screwed into place, whereupon the hook 7 may be released from the nose 9, allowing the end of the bolt or lug 3 to come against the end of the axle, and, of course, further turning of the nut will bring the lug or bolt into coincidence with the socket, 14, and thereby prevent further movement of the nut in either direction. I wish it to be understood, however, that I do not confine myself to the use of the box 12 for housing the spring and lug, for in some instances, it is feasible to provide the nut or the axle, as the case may be, with a bore 18, in which the bolt or lug 3 and the spring may be located, and a counter bore 19 extending to the outer end of the axle, or the outer face of the nut, as the case may be, and through which the stem 6 may be passed, as shown in Fig. 7.

It will be observed that in each of the above described forms of my invention, the locking bolt and the socket wherein this bolt is held are located within the trace or circle defined by the threaded wall of the nut, and are inclined in both rearward and outward direction; the advantage of such construction being that the necessity of weakening the threaded wall of the nut by forming therein a chamber of proper size to retain the bolt and its actuating spring is avoided, while a sufficient length of chamber for the bolt and spring is obtained and a secure engagement between the nut and axle is effected.

I claim.

1. The combination of an axle provided with a socket, a nut provided with a socket, a locking bolt located within one of said sockets and having a stem extending outside thereof, and a spring for holding said locking bolt normally in locked position, said locking bolt and said spring being located within the trace or circle defined by the threaded wall of the nut and being inclined in both rearward and outward directions, substantially as described.

2. The combination of an axle provided with a socket, a nut provided with a socket, a longitudinally movable locking bolt located within one of said sockets, and a coiled spring encircling the stem of said locking bolt, and having a bearing against said bolt and against the outer wall of the socket wherein said bolt is held, said locking bolt and said socket wherein it is held being located within the trace or circle defined by the threaded wall of the nut and being inclined in both rearward and outward directions, the stem of said locking bolt extending in position to be grasped in order that said bolt may be retracted, substantially as described.

3. The combination of an axle provided with a socket, a nut provided with a socket, and a longitudinally movable and rotatable locking bolt and an actuating spring located within one of said sockets, and provided with a stem extending therethrough, the said socket wherein the locking bolt is held being located within the trace or circle defined by the threaded wall of the nut, an inclined nose or projection located adjacent the outer end of the socket wherein the bolt is held, the stem of said bolt being furnished with an angular hook adapted to ride over said inclined nose or projection as the bolt is rotated and retracted, substantially as described.

4. The combination of a nut having a socket in one side thereof, the axle having a socket extending from the end or face thereof diagonally inward through one side thereof and adapted to register with said socket in the nut, and a locking bolt arranged in such axle socket, substantially as described.

5. The combination of a nut having a socket in its side wall, an axle having a socket adapted to register with a socket of the nut, said axle socket extending from the end or face of the axle diagonally inward through one side of the axle, and a locking bolt and its spring arranged within said axle socket, said locking bolt being provided with a stem extending through the outer end of said axle socket, substantially as described.

6. The combination of a nut having a socket in one side thereof, an axle having a socket extending from its outer end diagonally inward and through one side thereof, the outer end of said axle being provided with a depression and a projection adjacent the outer end of the axle socket, a locking bolt and its spring located within said axle socket and provided with a stem having a hook or angular portion adapted to ride over said projection, substantially as described.

NICOLAS BOSMANN.

Witnesses:
R. C. OMOHUNDRO,
W. D. CROSS.